No. 646,610. Patented Apr. 3, 1900.
F. A. SEIBERLING.
PNEUMATIC TIRE REPAIRING APPARATUS.
(Application filed Nov. 23, 1899.)

(No Model.) 2 Sheets—Sheet I.

Witnesses:
Myrtle Dressler.
Pearl G. Kader

Inventor:
Frank A. Seiberling,
by Humphrey & Humphrey,
Attys.

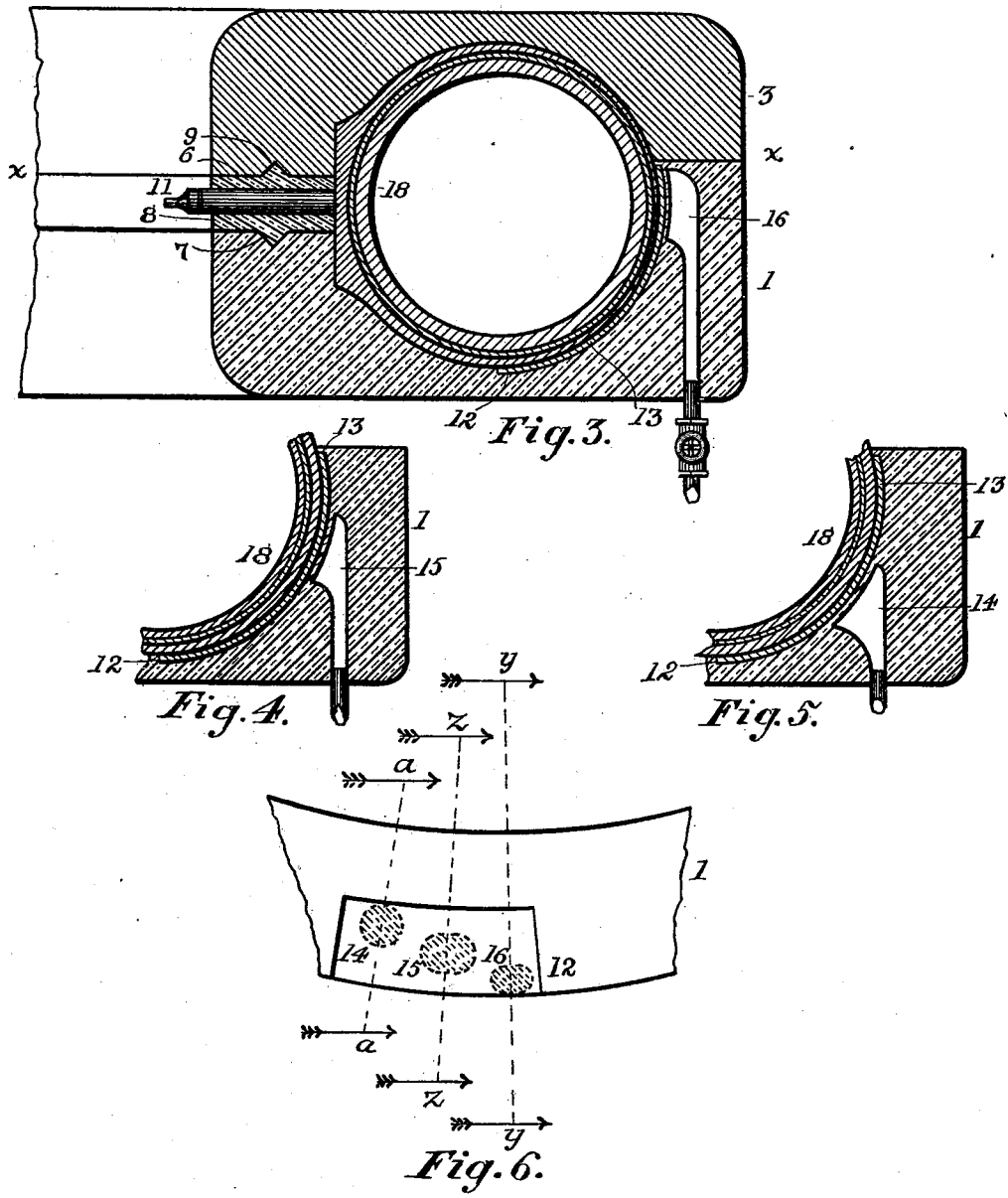

UNITED STATES PATENT OFFICE.

FRANK A. SEIBERLING, OF AKRON, OHIO, ASSIGNOR TO THE GOODYEAR TIRE AND RUBBER COMPANY, OF SAME PLACE.

PNEUMATIC-TIRE-REPAIRING APPARATUS.

SPECIFICATION forming part of Letters Patent No. 646,610, dated April 3, 1900.

Application filed November 23, 1899. Serial No. 738,070. (No model.)

*To all whom it may concern:*

Be it known that I, FRANK A. SEIBERLING, a citizen of the United States, residing at Akron, in the county of Summit and State of Ohio, have invented a certain new and useful Improvement in Pneumatic-Tire-Repairing Apparatus, of which the following is a specification.

My invention has relation to improvements in devices for repairing punctures or other fractures in pneumatic rubber tires, and especially tires for automobiles and like vehicles, where the initial cost of the tire is such that its rejection by reason of a break or puncture involves a serious financial loss. It has been demonstrated by experience that an attempt to revulcanize the entire tire for the purpose of curing a piece to cover the puncture impairs the structure of the entire tire and renders it weaker to sustain the ordinary strain and wear of travel, and where the break is of such size as that any of the ordinary means of plugging with rubber and cement are insufficient the tire must be thrown aside.

To overcome these objections is the object of this invention; and it consists in certain peculiar and novel features of construction and combination of parts hereinafter described and specifically claimed, reference being had to the accompanying drawings, forming a part of this specification.

Figure 2:
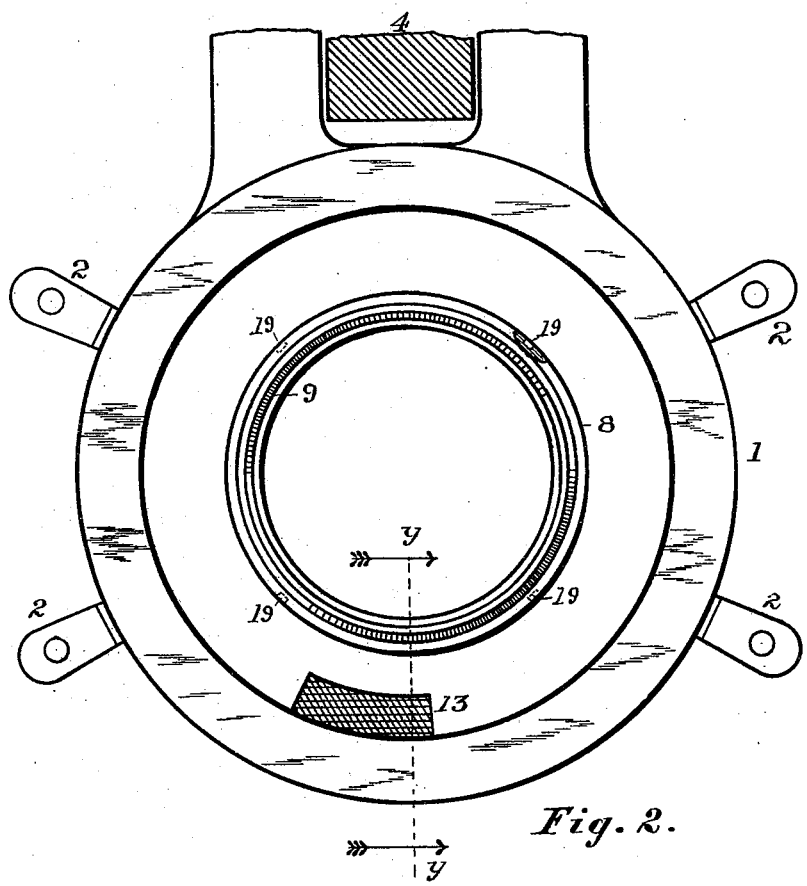
Figure 1:
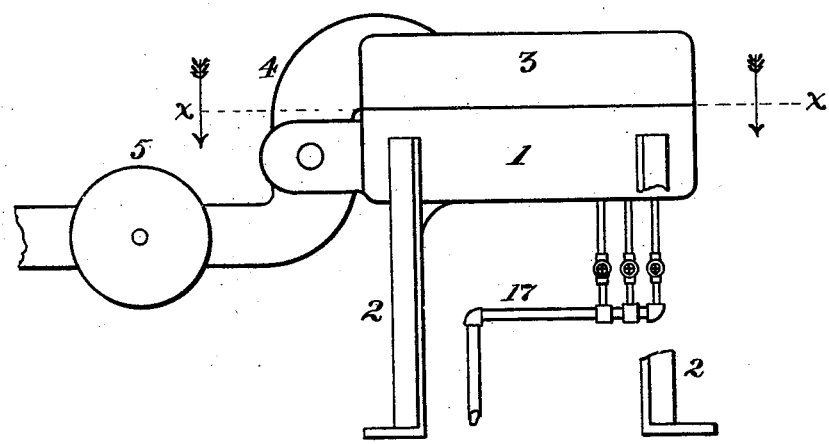

In the accompanying drawings, in which similar reference-numerals indicate like parts in the different views, Figure 1 is a side elevation of a tire-repairing press embodying my invention; Fig. 2, an enlarged plan of the lower half of the press at the line X X of Fig. 1; Fig. 3, an enlarged cross-section of the same at the line Y Y of Figs. 2 and 6; Fig. 4, a similar section of the lower part of the lower member of the press at the line Z Z of Fig. 6; Fig. 5, a similar section at the line *a a* of Fig. 6, and Fig. 6 a plan of a portion of the lower member of the press to illustrate the location of the terminal chambers of the curing-pipes shown in the foregoing figures.

The press consists, primarily, of two members, the lower member 1 supported on legs 2 2 and the upper member 3 hinged thereto by means of a bent arm 4, counterbalanced by a weight 5. The configuration of the annular grooves in the upper and lower members of the press are semicircular and, except as hereinafter stated, are continuously smooth and adapted to fit and inclose the tire. The inner adjacent faces of the upper and lower members of the press are cut away, leaving an annular space between them, with channels 6 7 in the adjacent edges, (see Fig. 3,) and in the space thus formed is fitted a ring 8, having annular beads 9 10 in its upper and lower faces to fit in the channels 6 7 and provided with a hole adapted to receive the tube 11 for inflating the tire when the latter is inclosed in the press, and instead of cutting away the inner adjacent faces of both members, as shown, it will be obvious that the annular space may be entirely in one member and practically subserve the same purpose; but the form shown is preferred. By this arrangement when the tire to be repaired is placed in the press the ring 8, containing the inflating-tube, may be turned to bring the injured portion of the tire in connection with the heating mechanism now to be described.

In the lower member 1 of the press is a shallow recess 12, ordinarily about one-tenth of the circumference of the channel, the depth of which recess is preferably one-half of an inch, but may be deepened or made shallower, as experience may determine. In this recess is a detachable plate 13, which snugly fits the recess and whose inner face forms a continuation of the inner surface of the channel. As many tires have peculiar external marks upon them in form of bosses or ridges, different detachable plates 13 are provided, conformed to fit these different tires, so that in the repairing process the original marking will be restored and preserved and the plate 13 fitted to the marks about the fracture, thus adapting the apparatus to these different tires. From the bottom of the lower member 1 of the press there extend upward a number of holes 14 15 16, terminating in enlarged chambers opposite different heights of the recess 12 to adapt it to different locations of puncture and divided therefrom by a thin shell of metal, as illustrated in Figs. 3, 4, and 5. The relative position of these chambers is illustrated more fully in Fig. 6. Each of the chambers 14 15 16 is united by a pipe with the main pipe 17, connected with a source of live steam, and each is provided with a valve, as shown in Fig. 1.

In operation the tire 18, here shown as composed of external and internal layers of rubber and an intermediate layer of woven fabric, is placed in the press with its inflating-tube in the opening in the ring 8, and in this position the two are turned until the fracture is opposite one of the enlarged terminals of the holes 14, 15, or 16. The appropriate detachable plate 13 having been placed in the recess 12 and a suitable patch of prepared unvulcanized rubber over the fracture, the press is closed and the tire inflated with air through the tube 11. The appropriate steam-valve is opened to permit the live steam to heat the rubber patch, and this is continued until the patch is thoroughly vulcanized, any water caused by condensation in the chamber escaping back down the pipe, passing the steam in its descent. In this process the compressed air holds the tire against the plate 13, thus causing the patch to assume the same configuration as the balance of the tire. When suitable time has elapsed, the press is opened and the repaired tire removed. As many of these tires are provided on the inner periphery with metallic screw-threaded nuts or bosses to receive screws by which they are secured to the wheel-rim, suitable openings in the ring 8 are provided, in which they may rest, as shown at 19 in Fig. 2.

This apparatus is designed to repair any fracture to which the tire is ordinarily liable whether in the center of the tread or at either side, and, if the latter, the side where the fracture exists will be placed downward in the press.

I claim as my invention—

1. In a pneumatic-tire-repairing apparatus, a separable annular press having annular grooves to fit said tire, the outer part of the lower half of said press extended above the medial line of said grooves, means for inflating the tire in the press and for heating a portion of the lower half less than one-half its transverse circumference to vulcanize a patch on said tire, substantially as shown and described.

2. In a tire-repairing apparatus a separable annular press having annular grooves to fit said tire, the outer part of one-half of said press extended beyond the medial line of said grooves, means for inflating the tire in the press and for heating different determinate parts of said lower half of said press, said parts being in area less than one-half of the transverse circumference of said annular grooves, substantially as shown and described.

3. In a pneumatic-tire-repairing apparatus, the combination of an upper and an under member adapted to meet and register having in their adjacent faces a channel to receive the tire, the inner adjacent faces cut away to form an annular recess, a ring arranged to rest and turn in said recess a hole in said ring to receive the inflating-tube of said tire with means for inflating the same, and openings in one of said members to convey live steam to a determinate part thereof, substantially as shown and described.

4. In a pneumatic-tire-repairing apparatus, the combination of an upper and an under member adapted to meet and register having in their adjacent faces a channel to receive the tire, a recess in the channel of one of said members to receive a detachable plate, a detachable plate to fit said recess, and having its inner face conformed to fit said tire, an opening in one of said members to introduce live steam to heat the part of said channel containing said recess, and said plate and means for inflating said tire in said press, substantially as shown and for the purpose specified.

5. In a pneumatic-tire-repairing apparatus, the combination of an upper and an under member adapted to meet and register having in their adjacent faces a channel to receive the tire, with their inner adjacent faces cut away to form an annular recess, and provided with annular guides, a ring arranged to rest and turn in said recess having annular ridges to fit said guides, a hole in said ring to receive the inflating-tube of said tire and openings in one of said members to convey live steam to a determined part thereof, substantially as shown and described.

6. In a tire-repairing press of the kind designated the combination of the upper member provided with annular grooves to receive the tire, the annular space between the inner faces of said members, the ring adapted to fit and turn in said space, the opening for the inflating-tube in the ring, the heating-chambers in one member arranged at different heights, the pipes connecting said chambers with a main steam-pipe, the recess in one of said members and the detachable plate in said recess, all constructed and arranged to operate, substantially as described.

In testimony that I claim the above I hereunto set my hand.

FRANK A. SEIBERLING.

In presence of—
C. P. HUMPHREY,
C. E. HUMPHREY.